United States Patent [19]

Ward

[11] Patent Number: 4,610,788
[45] Date of Patent: Sep. 9, 1986

[54] OIL/WATER SEPARATING SYSTEM

[76] Inventor: Jay A. Ward, Box 185, Cody, Wyo. 82414

[21] Appl. No.: 730,730

[22] Filed: May 6, 1985

[51] Int. Cl.$^4$ .............................................. E02B 15/04
[52] U.S. Cl. ............................... 210/242.3; 210/923; 405/60
[58] Field of Search .................. 210/241, 242.1, 242.3, 210/416.5, 922, 923, 747, 776, 170, 418; 405/60, 63, 66, 74, 87, 88; 114/232, 234; 137/236

[56] References Cited

U.S. PATENT DOCUMENTS

| | | | |
|---|---|---|---|
| 3,962,093 | 6/1976 | Gibson | 210/242.3 |
| 4,067,811 | 1/1978 | Dallamore | 210/242.3 |
| 4,070,423 | 1/1978 | Pierce | 210/242.2 |
| 4,142,972 | 3/1979 | Nebeker et al. | 210/242.3 |
| 4,146,482 | 3/1979 | Shyu | 210/242.3 |
| 4,186,095 | 1/1980 | Walin | 210/242.3 |
| 4,196,087 | 4/1980 | Gordon | 210/242.3 |
| 4,332,519 | 6/1982 | Walin | 210/242.3 |
| 4,449,850 | 5/1984 | Cessou et al. | 405/60 |

Primary Examiner—Richard V. Fisher
Assistant Examiner—Wanda L. Millard
Attorney, Agent, or Firm—Arthur L. Urban

[57] ABSTRACT

An oil/water separating system includes a skimming apparatus and a separating apparatus operatively connected therewith through a flexible conduit. The skimming apparatus includes an elongated central member disposed in a generally vertical orientation with an enlarged stabilizing section disposed adjacent a lower end thereof. A plurality of equally spaced arm members extends radially from the central member with each including spaced upper and lower arm sections and an elongated float member extending therebetween. An adjustable inlet portion disposed above the central member and operatively connected therewith includes a central downspout member axially aligned above the central member in a communicating relationship. A transverse plate section surrounds the top of the downspout member and a plurality of equally spaced vertically oriented fin sections extend radially outwardly therefrom. A bar section extends between ends of each pair of adjoining fin sections. The separating apparatus includes an elongated vertically oriented main chamber with an open bottom. A liquid inlet into the chamber is disposed adjacent the open bottom. A float is adjacent an upper end of the chamber. An adjustable vertically oriented oil downspout disposed within the chamber along the axis thereof is located adjacent an upper end of the chamber. A discharge conduit operatively connects the downspout and the exterior of the chamber.

17 Claims, 5 Drawing Figures

OIL/WATER SEPARATING SYSTEM

This invention relates to a novel separating system and more particularly relates to a new system for separating mixtures of oil and water.

In the petroleum industry, it is commonly accepted that even after oil cannot be pumped from the wells by conventional techniques, the fields still contain significant amounts of oil. A variety of special treatments and procedures have been developed so additional oil can be recovered from such wells.

One technique commonly employed is the water injection of oil fields. This technique involves the pumping of water into peripheral wells of a field and the removal of a mixture of oil and water from centrally located wells.

Although this technique achieves production from an old field, the procedure is not without complications. An important difference in the operation is the necessity for separating the large amounts of water from the oil.

One method for accomplishing this separation involves passing the mixture through a series of pits or ponds with the oil rich upper layer being separated from the mixture placed into the first pit being transferred to the next pit. This sequence is repeated in each succeeding pit to concentrate the oil fraction and remove increasing amounts of the water.

Although this method is a satisfactory way to separate the oil, there are other considerations. One is the disposal of the water rich layers from each pond or pit. The oil content in the water layers of the first ponds may be sufficient to warrant recovery is another factor.

Other factors are the regulations of environmental protection agencies which restrict the disposal of oil containing water to avoid contamination of the disposal sites and surrounding areas. These factors have increased the necessity for employing more thorough and sometimes more complicated procedures and equipment.

One common procedure is to utilize a secondary series of pits. The water rich layer passes from one pit to the next with an oil layer being separated at each step to reduce the oil concentration to a minimum.

To separate the oil from the water it is customary to skim the oil rich layer from the surface of the liquid in the pit. Since it is desired to skim only a thin upper layer, some means such as a barrier positioned just below the surface is utilized. Since the depth of the liquid in the pit varies, a fixed barrier is not suitable. Instead, the barrier must be movable to reflect changes within the level of the liquid.

A convenient way to achieve this movement is through a floating intake or skimmer. Although floating intakes are widely used in a variety of skimming operations, they function best when the liquid being skimmed has a constant formulation. The skimmer can be positioned to float at a desired level to accomplish the desired separation.

However, when the proportions of the ingredients change during the operation of the skimmer such as in the oil recovery pits, the level at which the skimmer floats with respect to the surface will change and adjustment of the position of the skimmer is necessary. In some situations this adjustment may have to be done relatively frequently.

In the separation of oil from water as encountered in the oil well water injection procedures described above, skimmers previously proposed employ large intake assemblies that extend outwardly from a downspout along the surface of the liquid. The assemblies are relatively thin in their vertical dimension and quite broad horizontally so they will float close to the surface. Generally, they include some means for adjusting the level of the top of the downspout. Such devices can function satisfactorily where the relative proportions of the oil and water in the liquid are relatively constant.

However, if significant changes occur in the relative proportions of the oil and water in the liquid, the density of the liquid will change and the position of the skimmer with respect to the surface will change. This change in level can cause the skimmer to be too high with respect to the surface so that no liquid enters the skimmer. On the other hand, if the skimmer is too low, it may allow water to enter the system which will adversely affect the operation and efficiency thereof. To avoid these problems, the liquid must be constantly monitored and frequent level adjustments may be required.

Adjusting the height of the skimmer can be a very frustrating and time-consuming task requiring the efforts of several persons. Since the skimmer is floating on the surface of the oil/water mixture in a pit of considerable size, adjusting mechanism at the center of the skimmer is at some distance from the edge of the pit and generally beyond the reach of a workman.

Thus, some method must be improvised to reach the adjusting mechanism. One method is to utilize machinery that has an extendable arm such as a backhoe, that will hold a man above the skimmer. Even then, the individual doing the adjusting has to reach down to the surface of the oily liquid and perform the adjustment while being careful not to fall into the pit. Alternatively, a workman at the pit edge may try to make the adjustment with a tool having a long extension handle. Because of these problems, a workman may be willing to perform this task when it is only required occasionally, but if it must be repeated frequently it can be a source of irritation and cause the workman to quit his job.

From the above discussion, it is clear that previous methods and devices do not operate satisfactorily under the variable separation conditions commonly encountered. Thus, there is a need for a new system and procedure that overcomes the shortcomings of earlier devices.

The present invention provides a novel oil/water separating system with features and benefits not found in previous methods and devices. The system of the present invention automatically maintains the skimming apparatus at the proper level irrespective of changes in the relative proportions of the oil and water. Thus, repetitive adjustments of the skimmer level are not required. The separating system of the invention provides accurate separation of the oil and water fractions automatically even with changes in the oil/water ratio.

The oil/water separating system of the present invention is simple in design and can be produced relatively inexpensively. Commercially available materials and components can be used in the manufacture of the system. Conventional industrial metal fabricating techniques and procedures can be employed using semi-skilled labor. The system components are durable in construction and have a long useful life.

Workmen can operate the system of the invention efficiently after only a minimum of instruction. Little supervision is required to keep the system operating efficiently. A single adjustment of the system at start up ordinarily is all that is required. The separating system of the invention can be modified easily to meet specific operating requirements.

These and other benefits and advantages of the novel oil/water separating system of the present invention will be apparent from the following description and the accompanying drawings in which.

Figure 1:
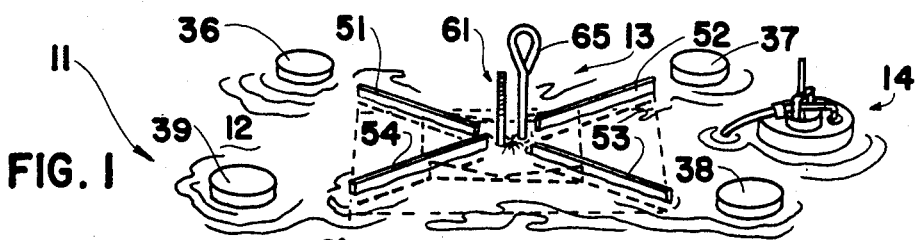
FIG. 1 is a view in perspective of one form of the oil/water separating system of the invention in use in a reservoir containing an oil/water mixture.
Figure 2:
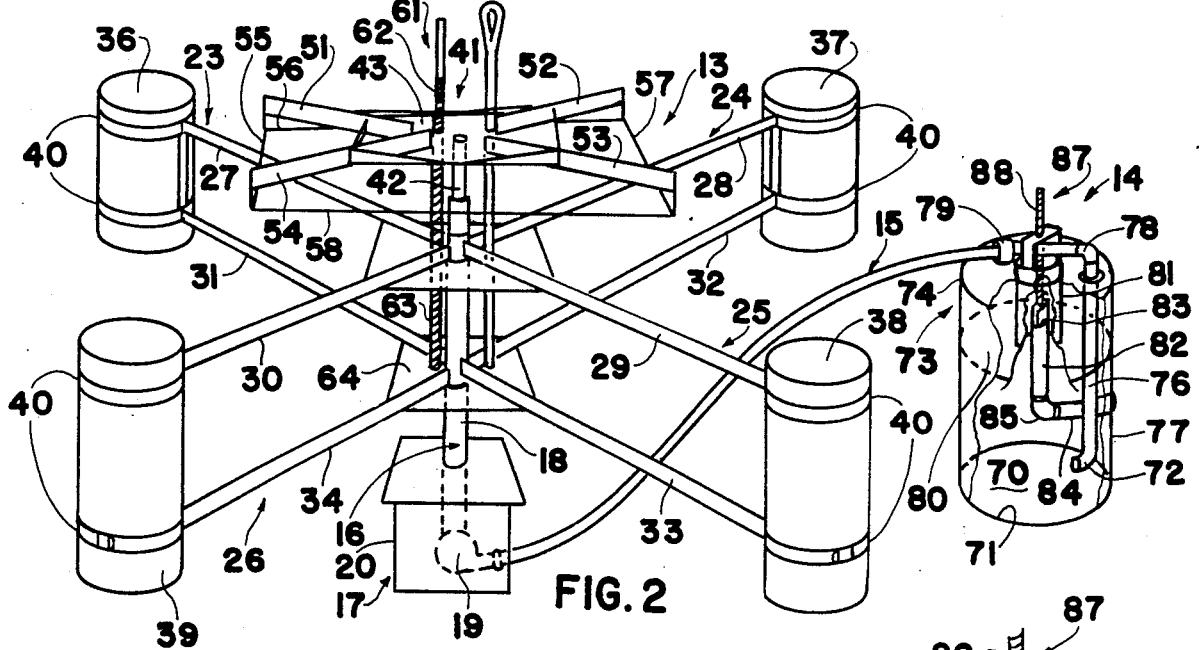
FIG. 2 is an enlarged view in perspective of the separating system shown in FIG. 1 removed from the reservoir.
Figure 3:
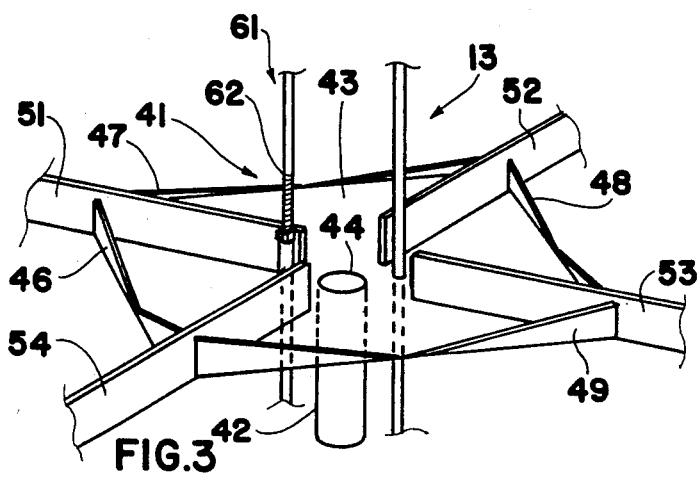
FIG. 3 is a further enlarged fragmentary view in perspective of the skimming apparatus with parts separated.
Figure 4:
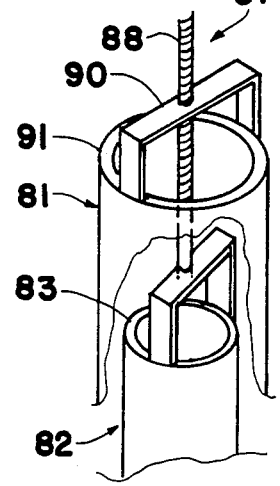
FIG. 4 is an enlarged fragmentary side view of the separating apparatus shown in FIG. 2.

As shown in the drawings, one form of the novel oil/water separating system 11 of the present invention is positioned for use in a reservoir such as a pit or pond 12 that includes a mixture of oil and water. The system 11 includes a skimming apparatus 13 and a separating apparatus 14. The skimming apparatus 13 and the separating apparatus 14 are operatively connected through a flexible conduit member 15.

The skimming apparatus 13 of the oil/water separating system 11 of the present invention includes an elongated central member 16. The central member 16 is disposed in a generally vertical orientation. An enlarged stabilizing section 17 is disposed adjacent a lower end 18 of the central member. Advantageously, the stabilizing section 17 includes a pump 19 disposed within an enclosure 20 that is affixed to the lower end of the central member 16. In this structure, the flexible conduit 15 extends from the pump 19 to the separating apparatus 14.

A plurality of equally spaced arm members, at least four in number, 23, 24, 25 and 26 extend radially from the central member 16. Each of the arm members 23–26 includes an upper arm section 27, 28, 29 or 30 and a lower arm section 31, 32, 33 or 34 respectively. The upper and lower arm sections of each arm member are spaced from each other a significant distance.

An elongated float member 36, 37, 38 and 39 extends between each pair of upper and lower arm sections. Thus, float member 36 extends between arm sections 27 and 31, float member 37 between arms 28 and 32, float 38 between arms 29 and 33, and float 39 between arms 30 and 34. Advantageously, the upper and lower arm sections include band fasteners 40 at the free ends thereof remote from the central member 16. A pair of band fasteners surround the upper and lower portions of each float member 36–39. The float members preferably are cylindrical sealed chambers as shown in the drawings.

The skimming apparatus 13 also includes an inlet portion 41 disposed above the central member 16 and operatively connected with same. The inlet portion 41 includes a central downspout member 42 that is axially aligned above the central member 16. The downspout member 42 is disposed in a communicating relationship with the central member. Advantageously, the downspout member and the central member are disposed in an overlapping relationship.

A transverse plate section 43 surrounds the downspout member 42. The transverse plate section is disposed closely adjacent to the top 44 of the downspout member. The plate section 43 preferably has a square configuration. The plate section advantageously includes a plurality of V-shaped overflow sections 46, 47, 48 and 49 with one overflow section extending along each side of the plate section.

A plurality of fin sections 51, 52, 53 and 54 extend from the plate section 43. The fin sections 51–54 are equally spaced from one another. The fin sections are vertically oriented with respect to the plate section. The fin sections extend horizontally outwardly from the upper surface of the plate section and radially with respect to the downspout member 42. Preferably, the fin sections extend outwardly from each corner of the plate section.

A plurality of bar sections 55, 56, 57 and 58 connect the adjacent free ends of the fin sections. One of the bar sections extends between each pair of adjoining fin sections. Thus, bar section 55 joins fin sections 51 and 52, bar 56 joins fins 52 and 53, bar 57 joins fins 53 and 54, and bar 58 connects fins 54 and 51. Preferred bars are thin cylindrical rods.

Adjusting means 61 controls the height of the downspout member 42 above the central member 16. The adjusting means includes a screw member 62 that is operatively connected to the plate section 43 and the central member 16. Advantageously, the lower end 63 of the screw 62 bears against a transverse support section 64 that extends from the central member. The skimming apparatus also may include a handling ring member 65 to facilitate placement into pit 12.

The separating apparatus 14 of the oil/water separating system 11 of the present invention is disposed adjacent to the skimming apparatus 13. The separating apparatus 14 includes an elongated main chamber 70. The chamber is oriented vertically and includes a substantially open bottom 71. A liquid inlet 72 into the chamber 70 is disposed adjacent the open bottom. Flotation means 73 is located adjacent an upper end 74 of the chamber.

The chamber 70 advantageously has a cylindrical configuration. The liquid inlet 72 preferably communicates with the flexible conduit member 15 through a conduit 76 that extends upwardly inside the chamber close to a sidewall 77 thereof. Advantageously, the conduit 76 also includes a horizontal section 78 across the top of the chamber.

Preferably, the flexible conduit member 15 includes a quick connect coupling 79 adjacent the separating apparatus 14. It is preferred that the flotation means 73 include a sealed chamber 80. The sealed chamber 80 surrounds a reduced width upper portion 81 of the main chamber 70.

The separating apparatus 14 also includes an oil downspout 82 disposed within the main chamber 70. The downspout is oriented vertically along the axis of the chamber. Advantageously an upper end 83 of the downspout 82 is located adjacent an upper end 74 of the chamber. The upper end of the downspout preferably is disposed within the reduced width upper portion 81 of the main chamber.

A discharge conduit 84 operatively connects the downspout 82 with the exterior of the chamber 70. The discharge conduit advantageously is a flexible member that is affixed to the lower end 85 of the downspout.

Adjusting means 87 extends between the downspout 82 and the upper end of the separating apparatus 14. The adjusting means includes a screw member 88. Preferably, the screw member 88 extends downwardly to the downspout from bracket member 90 disposed across the top 91 of the reduced width upper portion 81 of the chamber 70.

Figure 5:
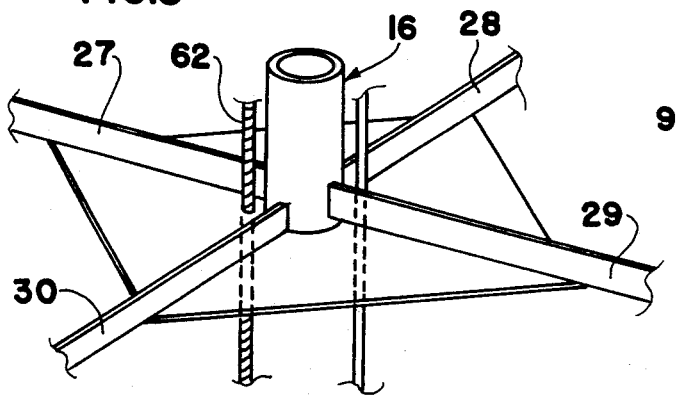
FIG. 5 is a fragmentary side view of another form of the skimming apparatus of the invention.
Figure 5:
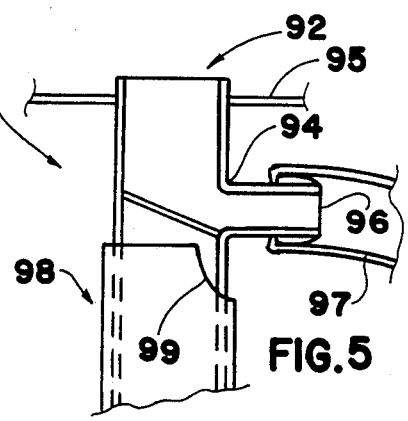

FIG. 5 illustrates another form of the oil/water separating system of the present invention. This system relies on gravity to transfer the liquid from the skimming apparatus to the separating apparatus. This is accomplished by withdrawing the liquid entering downspout member 92 of the skimming apparatus 93 from a point 94 therein just below transverse plate section 95. The collected liquid passes from an outlet 96 in the side of the downspout through a flexible conduit member 97 by gravity to separating apparatus (not shown) for further processing.

To provide maximum adjustment of the downspout member with respect to the central member 98 in which it is supported, the central member includes a cut out section 99 adjacent the outlet 96. With this construction, no pump box is required and the lower stabilizing section (not shown) may be of a different configuration such as a plurality of spaced vertical plate sections extending from the lower end of the central member 98.

The skimming and separating apparatus 13 and 14 of the system 11 of the invention may be fabricated from conventional structural materials such as steel and similar metals. Some of the components also may be formed of plastic if desired.

In the use of the oil/water separating system of the present invention, the skimming and separating apparatus 13 and 14 first are installed in the pit 12. This may be accomplished by positioning each apparatus in the pit in an area thereof in which the depth of the liquid is sufficient to allow the equipment to float freely off the bottom.

To assist in the positioning of the components, an endless rope may be stretched over pulleys located at remote parts along the bank of the pit. The components then are affixed to the rope and pulled into a downwind area of the pit at which the oil layer collects. The skimming apparatus and the separating apparatus are interconnected by the flexible conduit member 15.

Thereafter, electrical connection for the pump 19 is made. Also, the downspout member 42 of the skimming apparatus 13 and the downspout 82 of the separating apparatus 14 are adjusted with respect to the liquid level using screws 62 and 88 respectively. The system now is ready for use.

Pump 19 is activated causing the oil rich layer at the surface of pond 12 to be drawn past weed retarding bar sections 55-58 and between the adjoining fin sections 51-54 associated therewith. The surface liquid passes overflow sections 46-49, the upper surface of plate section 43 and enters downspout member 41.

The oil rich liquid is drawn into centrifugal pump 19 and forced therefrom along flexible conduit member 15 and conduit 76. The liquid is forced from inlet 72 into chamber 70 which already is filled with liquid from the pit in which it is suspended. The liquid entering the chamber 70 from the inlet impinges on the liquid already therein and separates into the oil rich and water rich fractions.

The oil rich portion moves upwardly into the reduced width upper portion 81 and rises to the top of the downspout 82. The liquid flows into the downspout and through conduit 84 and then to other oil treating apparatus (not shown). The water rich layer moves downwardly through the open bottom 71 and mixes with the liquid in the pit for further recycling.

The system 11 ordinarily is operated on a continuous basis with new liquid entering the pond and oil rich liquid being drawn from the separating system. The skimming and separating apparatus 13 and 14 maintain desired levels with respect to the liquid surface irrespective of changes in the proportions of the oil and water in the material entering the pond.

The oil/water separating system of the present invention provides for the quick and efficient removal of oil accumulated on the surface of secondary oil recovery pits in water flood oil fields common in the oil industry. Since the oil is recovered quickly, the valuable light fractions of the petroleum are saved and not lost through evaporation. Furthermore, the water released is cleaner with respect to the residual oil and thus is more compatible with the environment.

The separating system of the invention accommodates changes in oil/water proportions without repetitive adjustments. The apparatus can be fabricated from commercially available materials and components using conventional manufacturing procedures. The apparatus of the invention is durable in construction and requires little maintenance. The positioning of the pump far below the surface of the liquid substantially eliminates the risk of explosion.

It will be apparent that various modifications can be made in the particular oil/water separating system described in detail above and shown in the drawings within the scope of the present invention. The size, configuration and arrangement of components can be changed to meet specific requirements. A greater number of arm members may be employed in the skimming apparatus. The means for adjusting the downspouts can be different. Accessories such as weed screens, beating coils and the like can be added if desired. These and other changes can be made in the separating system of the invention provided the functioning and operation thereof are not adversely affected. Therefore, the scope of the present invention is to be limited only by the following claims.

What is claimed is:

1. Oil/water separating system including a skimming apparatus and a separating apparatus operatively connected therewith; said skimming apparatus including an elongated central member disposed in a generally vertical orientation, an enlarged stabilizing section disposed adjacent a lower end of said central member, a plurality of equally spaced arm members at least four in number extending radially from said central member, each of said arm members including an upper arm section and a lower arm section spaced a significant distance therefrom, an elongated float member extending between each pair of said upper and lower arm sections, an inlet portion disposed above said central member and operatively connected therewith, said inlet portion including a central downspout member axially aligned above said central member in a communicating relationship, a transverse plate section surrounding said downspout member, said plate section being disposed closely adjacent to the top of said downspout member, a plurality of equally spaced vertically oriented fin sections extending horizontally outwardly from the upper surface of said plate section and radially of said downspout member, a bar section extending between each pair of adjoining fin sections adjacent the free ends thereof, adjusting means controlling the height of said downspout member above said central member, said adjusting means including a screw member operatively connecting said plate section and said central member; said separating apparatus being disposed adjacent to said skimming apparatus and operatively connected with said downspout member thereof through a flexible conduit member, said separating apparatus including an elongated vertically oriented main chamber, said chamber including a substantially open bottom, a liquid inlet into said chamber disposed adjacent said open bottom, flotation means adjacent an upper end of said chamber, a vertically oriented oil downspout disposed within said chamber along the axis thereof, an upper end of said oil downspout being located adjacent an upper end of said chamber, a discharge conduit operatively connected between said oil downspout and the exterior of said chamber, adjusting means controlling the height of said oil downspout within said chamber, said oil downspout adjusting means including a screw member extending between said oil downspout and the upper end of said separating apparatus; whereby when said skimming and separating apparatus are floating in a reservoir containing an oil/water mixture a surface layer thereof enters said downspout member of said skimming apparatus and passes through said flexible conduit member into said separating apparatus wherein an oil rich portion rises to the top of said main chamber and flows into and through said oil downspout and the water rich portion passes out of the bottom of said chamber.

2. Oil/water separating system according to claim 1 wherein said stabilizing section of said skimming apparatus includes a pump disposed within an enclosure affixed to a lower end of said central member.

3. Oil/water separating system according to claim 2 wherein said flexible conduit member extends from said pump to said separating apparatus.

4. Oil/water separating system according to claim 1 wherein said flexible conduit member extends from said downspout member below and closely adjacent to said plate section of said separating apparatus.

5. Oil/water separating system according to claim 1 wherein said float members of said skimming apparatus are cylindrical sealed chambers.

6. Oil/water separating system according to claim 1 wherein said free ends of said upper and lower arm sections of said skimming apparatus include band fasteners surrounding said float members.

7. Oil/water separating system according to claim 1 wherein said downspout member and said central member of said skimming apparatus are disposed in an overlapping relationship.

8. Oil/water separating system according to claim 1 wherein said plate section of said skimming apparatus has a square configuration with a fin section extending outwardly from each corner thereof.

9. Oil/water separating system according to claim 1 wherein said plate section includes V-shaped overflow sections disposed along each side thereof.

10. Oil/water separating system according to claim 1 wherein a lower end of said screw member of said downspout member adjusting means bears against a transverse support section extending from said central member.

11. Oil/water separating system according to claim 1 wherein said separating apparatus chamber has a cylindrical configuration.

12. Oil/water separating system according to claim 1 wherein said liquid inlet of said separating apparatus communicates with said flexible conduit member from said skimming apparatus through a conduit extending upwardly inside said chamber close to a sidewall thereof and across the top thereof.

13. Oil/water separating system according to claim 1 wherein said flexible conduit member includes a quick connect coupling adjacent said separating apparatus.

14. Oil/water separating system according to claim 1 wherein said separating apparatus flotation means includes a sealed chamber surrounding a reduced width upper portion of said chamber.

15. Oil/water separating system according to claim 14 wherein the upper part of said oil downspout is disposed within said reduced width upper portion of said chamber.

16. Oil/water separating system according to claim 14 wherein said screw member of said oil downspout extends downwardly to said oil downspout from a bracket member across the top of said reduced width upper portion of said chamber.

17. Oil/water separating system according to claim 1 wherein said discharge conduit is a flexible member.

* * * * *